United States Patent [19]

Yamazaki

[11] Patent Number: 4,587,935

[45] Date of Patent: May 13, 1986

[54] OUTBOARD MOTOR WITH ENGINE TACHOMETER

[75] Inventor: Toshiyuki Yamazaki, Iwata, Japan

[73] Assignee: Sanshin Kogyo Kabushiki Kaisha, Japan

[21] Appl. No.: 699,644

[22] Filed: Feb. 8, 1985

[30] Foreign Application Priority Data

Feb. 16, 1984 [JP] Japan .................................. 59-26035

[51] Int. Cl.⁴ .......................... F02B 77/08; G01P 3/48

[52] U.S. Cl. ............................. 123/198 R; 123/198 E; 324/208; 324/174; 324/169

[58] Field of Search ........................ 123/198 R, 198 E; 324/207, 208, 226, 169, 173, 174

[56] References Cited

U.S. PATENT DOCUMENTS

| | | | |
|---|---|---|---|
| 1,738,772 | 12/1929 | Harry | 440/2 |
| 2,549,480 | 4/1951 | Kiekhaefer | 74/12 |
| 2,627,181 | 2/1953 | Kiekhaefer | 73/182 |
| 2,649,848 | 8/1953 | Armstrong | 123/198 E |
| 2,798,472 | 7/1957 | Armstrong | 123/198 R |
| 3,845,839 | 11/1974 | Eriksson | 123/198 E |

OTHER PUBLICATIONS

Sales Pamphlet, Model DET-200, 201, 301 and 550, Oppama Industry Co. Ltd.

*Primary Examiner*—Ira S. Lazarus

*Attorney, Agent, or Firm*—Ernest A. Beutler

[57] ABSTRACT

Two embodiments of improved electric tachometers for outboard motors wherein the tachometer and its driving sensor are mounted on the protective cowling of the power head of the motor and the sensor derives an electrical signal through an air gap so that no mechanical connection is required between the engine and the tachometer.

11 Claims, 4 Drawing Figures

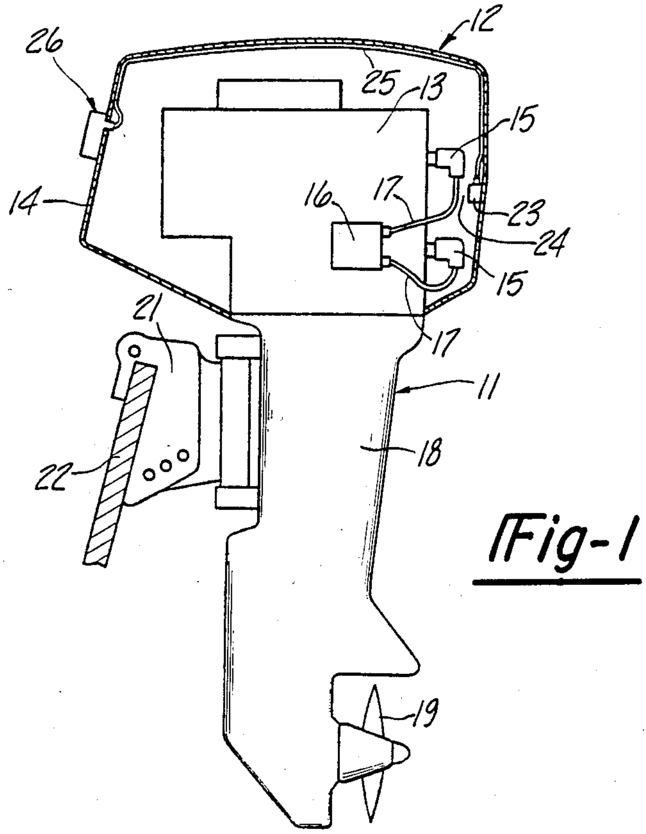
Fig-1
Fig-2
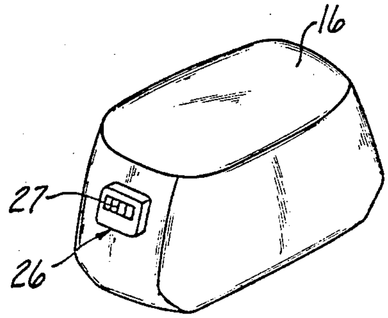

OUTBOARD MOTOR WITH ENGINE TACHOMETER

BACKGROUND OF THE INVENTION

This invention relates to an outboard motor with an engine tachometer and more particularly to an improved, simplified tachometer mounting and driving arrangement for an outboard motor.

Outboard motors, as with many applications wherein internal combustion engines are utilized as the driving media, can benefit by the provision of a device wherein the operator can monitor the speed of the engine. Monitoring engine speed has a number of known advantages. For this reason, the provision of a tachometer is frequently resorted to so as to permit the operator to monitor the engine speed.

With an outboard motor, on the other hand, it is somewhat difficult to provide a tachometer for measuring engine speed. The outboard motor normally includes a power head in which the internal combustion engine is contained. This engine is encircled by a protective cowling. Thus, if a tachometer is employed, some arrangement must be provided for conveying the engine speed signal from the engine externally through the cowling to an indicator device that is positioned in proximity to the operator. With mechanically driven tachometers, the disadvantages are obvious. The same is true with conventional electrical-type tachometers due to the fact that the cowling must be readily removable for servicing. In addition, the engine normally is free to vibrate relative to the cowling and this vibration, with systems of the the type heretofore proposed, has placed stress on the transmitting device (such as the wires) that can cause failures.

Devices have been proposed wherein the engine speed indicator is mounted on the protective cowling and is not directly driven by the engine. For example, U.S. Pat. No. 2,649,848, entitled "Speed Indicating Device For Outboard Motors", issued in the name of D. A. Armstrong on Aug. 25, 1953 shows an arrangement wherein the speed is indicated by a vibrating indicator. In a somewhat similar vein, U.S. Pat. No. 2,798,472, entitled "Engine Tachometer", issued in the name of D. A. Armstrong on July 9, 1957 shows a magnetic type of device. Although in principle these devices are meritorious, they do not provide a true indication of actual engine speed and are not sufficiently accurate.

It is, therefore, a principle object of this invention, to provide an improved outboard motor with an engine tachometer.

It is another object of this invention to provide an improved speed indicating device for an outboard motor that will provide a highly accurate and yet trouble free operation.

It is a further object of this invention to provide an engine tachometer for an outboard motor that is wholly supported by the engine cowling but which nevertheless provides an accurate indication of engine speed.

SUMMARY OF THE INVENTION

This invention is adapted to be embodied in an outboard motor comprising a power head containing an internal combustion engine surrounded by a protective cowling with an air gap formed in the power head between a portion of the internal combustion engine and the protective cowling. A drive shaft housing is fixed beneath the power head and carries marine propulsion means that are driven by the internal combustion engine. Electrically generating means are driven by the engine for generating an electrical output that varies with the speed of the engine. In accordance with the invention, sensor means are carried by the cowling in proximity to the electrical generating means for generating an electrical signal that is related to the output of the electrical generating means of the engine. Indicator means are carried by the protective cowling and positioned to be viewed by an operator of the motor for generating a speed signal in response to an electrical signal. Means are provided for transmitting the electrical signal generated by the sensor means to the indicator means for providing an engine speed indication to the operator.

BRIEF DESCRIPTION OF THE DRAWINGS

FIG. 1 is a side elevational view of an outboard motor, attached to the transom of an associated watercraft, with a portion broken away, showing a first embodiment of the invention.

FIG. 2 is a perspective view of the protective cowling of the outboard motor of this embodiment.

DETAILED DESCRIPTION OF THE PREFERRED EMBODIMENTS

Figure 3:
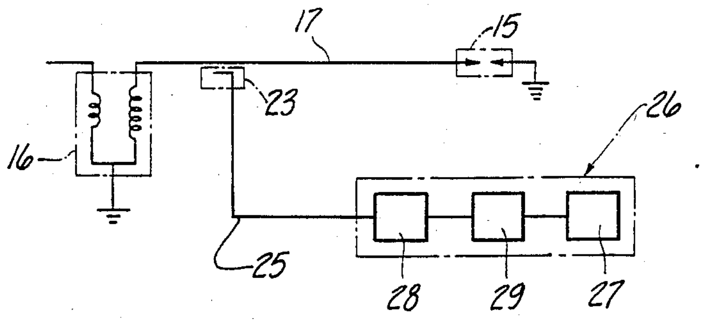
FIG. 3 is a schematic wiring diagram showing the operation of the ignition system and the engine speed sensor.

Referring first to FIGS. 1 through 3, an outboard motor constructed in accordance with this embodiment is identified generally by the reference numeral 11. The outboard motor 11 includes a power head, indicated generally by the reference numeral 12, that includes an internal combustion engine 13, which may be of any type, and a surrounding protective cowling 14. The engine 13, in the illustrated embodiment, is of the two cylinder reciprocating type and includes a pair of spark plugs 15 that are fired from an electrical ignition system including a spark coil 16 and connecting wires 17. Although the invention is described in connection with a two cylinder engine, it will be readily apparent to those people skilled in the art that the invention is adapted for use with engines having other numbers of cylinders or, other types of engines than reciprocating engines. This embodiment is, however, particularly adapted for use with spark ignited engines.

A drive shaft housing lower unit assembly 18 is fixed relative to the power head 12 and depends from it. A propeller 19 positioned at the lower end of the unit 18 is driven by the engine 13 in a known manner.

A combined swivel, clamping bracket assembly 21 is provided on the drive shaft housing 18 for steering and tilting movement of the outboard motor 11 as is well known in this art. The clamping bracket 21 includes means for detachably connecting the outboard motor 11 to the hull or transom of an associated watercraft, which is partially indicated at 22.

In accordance with the invention, the engine is provided with a tachometer arrangement of an improved type for providing a visual indication to an operator of the speed of running of the engine 13. This system includes a sensor 23 that is supported on the interior of the protective cowling 14 in proximity to one of the spark plug wires 17. There is an air gap 24 between the sensor 23 and the ignition wire 17. However, the flow of electrical currently through the spark plug wire 17 generates a magnetic field and the sensing device 23, may be of the inductive type, provides an output signal in response to the changes in this magnetic field.

The output from the sensing device 23 is transmitted through a conductor 25 that is affixed to the interior of the cowling to a tachometer device 26 that is positioned externally of the cowling 14 and at its forward face so as to readily viewed by an operator of the outboard motor. The tachometer 26 includes an indicator 27 that will provide an appropriate indication of engine speed.

An electrical schematic of the circuit of the device appears in FIG. 3 wherein the spark coil 16, spark plug wire 17 and spark plug 15 are illustrated schematically in the conventional manner. The sensing device 23, as seen in this figure, is juxtaposed to the spark plug wire 17 and its respective wire 25 provides an input signal to the tachometer 26. This input signal is first processed by a wave shaping circuit, indicated at 28, that provides an output signal of a shaped form to a counter circuit 28. The counter circuit 29, in turn, delivers its output to the indicator 27 so as to provide a speed indication in a manner which will be readily apparent to those versed in this art.

Figure 4:
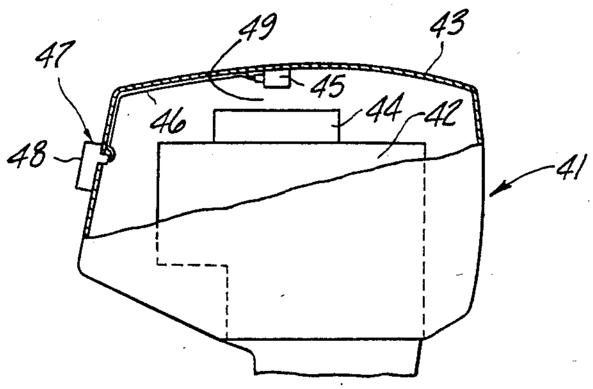
FIG. 4 is a partial view, in part similar to FIG. 1, showing another embodiment of the invention.

Referring now to the embodiment of FIG. 4, an outboard motor constructed in accordance with this embodiment is identified generally by the reference numeral 41. In this embodiment, like the previously described embodiment, the invention resides in the construction of the power head assembly and the associated components and, for this reason, only those components have been illustrated. The power head assembly consists of an internal combustion engine 42 which like the embodiment of FIGS. 1 through 3, may be of any known type. A protective cowling 43 encircles the engine 42.

In this embodiment, the engine 42 has a flywheel magneto 44 that provides a signal for generating the spark for the engine and also may provide other electrical generation for supplying power to other components of the associated watercraft.

Carried on the inside of the protective cowling 43, in proximity to the flywheel 44 and specifically to the permanent magnets carried by it, is a sensor assembly 45. The sensor assembly 45 generates an output signal each time the magnetic field changes and transmits this signal through a wire 46 positioned internally of the cowling 43 to a tachometer 47 of the appropriate type. Like the embodiment of FIGS. 1 through 3, the tachometer 47 has an indicator 48 that is mounted on the front portion of the cowling 45 and positioned so as to be readily viewed by an operator of the motor 41.

It should be noted that, as in the embodiment of FIGS. 1 through 3, the sensor 45 is spaced from the flywheel magnets 44 by an air gap 49. Thus, each embodiment provides an arrangement wherein there is no mechanical connection between the sensor and the engine. Furthermore, all components of the tachometer system including the sensors, wires and tachometer head themselves are directly affixed to the cowling so that there will be no relative movement of these components even though the engine may vibrate relative to the cowling. Thus, a very accurate indication of speed is provided while at the same time the likelihood of damage due to vibration is substantially minimized.

Although two embodiments of the invention have been illustrated and described, various changes and modifications may be made without departing from the spirit and scope of the invention, as defined by the appended claims.

I claim:

1. In an outboard motor comprising a power head containing an internal combustion engine surrounded by a protective cowling, an air gap formed in said power head between a portion of said internal combustion engine and said proective cowling, a drive shaft housing fixed beneath said power head and carrying marine propulsion means driven by said internal combustion engine, and electrical generating means driven by said engine for generating electrical output that varies with the speed of said internal combustion engine, the improvement comprising sensor means carried by said cowling in proximity to said electrical generating means for generating an electrical signal related to the electrical output of said electrical generating means, indicator means carried by said cowling and positioned to be viewed by an operator of said motor for providing a speed indication in response to an electrical signal, and means for transmitting a signal from said sensor means to said indicator means.

2. In an outboard motor as set forth in claim 1 wherein the air gap extends at least in part between the electrical generating means and the sensor means.

3. In an outboard motor as set forth in claim 1 wherein the means for transmitting the signal from the sensor means to the indicator means comprises a conductor contained within the protective cowling and supported thereby.

4. In an outboard motor as set forth in claim 3 wherein the indicator means is carried externally of the cowling.

5. In an outboard motor as set forth in claim 1 wherein the sensor means is an inductive sensor means for sensing a magnetic field and for providing a signal responsive to changes in the magnetic field.

6. In an outboard motor as set forth in claim 5 wherein the air gap extends at least in part between the electrical generating means and the sensor means.

7. In an outboard motor as set forth in claim 6 wherein the means for transmitting the signal from the sensor means to the indicator means comprises a conductor contained within the protective cowling and supported thereby.

8. In an outboard motor as set forth in claim 7 wherein the indicator means is carried externally of the cowling.

9. In an outboard motor as set forth in claim 5 wherein the electrical generating means comprises spark ignition means and the sensor means is juxtaposed to the spark ignition means.

10. In an outboard motor as set forth in claim 9 wherein the spark ignition means comprises a spark plug wire and the sensor means is juxtaposed to the wire.

11. In an outboard motor as set forth in claim 5 wherein the electrical generator means comprises a flywheel magneto having rotating magnet and the sensor means is juxtaposed to the path of travel of the magnets.

* * * * *